US012583081B2

(12) United States Patent
Ricker

(10) Patent No.: US 12,583,081 B2
(45) Date of Patent: Mar. 24, 2026

(54) SUBSTRATE DEPOSITION HOLDING APPARATUS

(71) Applicant: Plymouth Creative Products LLC, Massillon, OH (US)

(72) Inventor: John Ricker, Massillon, OH (US)

( * ) Notice: Subject to any disclaimer, the term of this patent is extended or adjusted under 35 U.S.C. 154(b) by 398 days.

(21) Appl. No.: 18/325,070

(22) Filed: May 29, 2023

(65) Prior Publication Data

US 2024/0399541 A1 Dec. 5, 2024

(51) Int. Cl.
*B25B 5/16* (2006.01)
*B41M 5/035* (2006.01)

(52) U.S. Cl.
CPC ........... *B25B 5/163* (2013.01); *B41M 5/0358* (2013.01)

(58) Field of Classification Search
CPC .... B25B 7/02; B25B 5/06; B25B 7/16; B25B 5/163; A41M 5/0358; B41F 17/002; B41F 16/0093; B41F 16/006; B41F 17/10; B23K 3/087; Y10T 156/1033
See application file for complete search history.

(56) References Cited

U.S. PATENT DOCUMENTS 4,943,684 A 7/1990 Kramer
5,755,921 A 5/1998 Christensen

FOREIGN PATENT DOCUMENTS

CN 207007596 U 2/2018
CN 213229268 U 5/2021
CN 213475334 U 6/2021
CN 214350833 U 10/2021
WO 1996012077 A1 4/1996

OTHER PUBLICATIONS

English translation and For CN207007596 (Year: 2018).*
LOKMAN 20 Pack 1 Inch Stainless Steel Cable Clamp, website link: "https://www.amazon.com/dp/B01HPE185E/", retrieved on May 23, 2023, pp. 9.
3D sublimation accessories, Title: 3D sublimation accessories wholesale 11 oz sublimation mug clamp, website link: "https://www.alibaba.com/product-detail/3D-sublimation-accessories-wholesale-11-oz_62208804477.html", retrieved on May 23, 2023, pp. 8.

(Continued)

*Primary Examiner* — Jason L Vaughan
*Assistant Examiner* — Amanda Kreiling

(57) ABSTRACT

A clamp-shaped substrate deposition holding apparatus is disclosed. The apparatus may include a first semi-circular member and a second semi-circular member. A second semi-circular member distal end may be pivotally attached to a first semi-circular member distal end, which may enable the first and second semi-circular members to move between a closed position and an open position. The apparatus may further include a first holding arm disposed on a first semi-circular member proximal end and a second holding arm disposed on a second semi-circular member proximal end. A first holding arm longitudinal axis and a second holding arm longitudinal axis may be disposed at a predefined angle relative to each other when the first and second semi-circular members may be in the closed position. The apparatus may further include first and second gripping pads disposed on first and second semi-circular member interior surfaces.

20 Claims, 9 Drawing Sheets

(56) References Cited

OTHER PUBLICATIONS

Mug Clamp, website link: "https://motivatebox.com/product/mug-clamp", retrieved on May 23, 2023, pp. 4.
Servo gripper V.2.3, Title: Servo gripper V.2.3, website link "https://www.youtube.com/watch?v=FtvOGnCIIU4" retrieved on May 23, 2023, pp. 3.

* cited by examiner

SUBSTRATE DEPOSITION HOLDING APPARATUS

TECHNICAL FIELD

The present disclosure relates to a substrate deposition holding apparatus, and more specifically to an apparatus that facilitates a user to wrap and tape a sublimation paper around a cylindrical tumbler.

BACKGROUND

Users typically use sublimation and heat transfer devices to imprint images or designs on cylindrical objects, e.g., tumblers, mugs, etc. A conventional method to imprint a design on a tumbler includes wrapping and manually taping a sublimation paper onto tumbler exterior surface, and then using a heat press machine to transfer the design from the sublimation paper to the tumbler exterior surface.

Wrapping and manually taping the sublimation paper to the tumbler exterior surface may be challenging, and if the sublimation paper is not properly wrapped and/or taped, the final imprinted design may not be optimal. For example, if a crease or a fold develops when a user wraps and tapes the sublimation paper, the final imprinted design may be of sub-optimal quality.

Thus, there is a need for an apparatus that may assist the users in wrapping and taping sublimation papers around cylindrical objects.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
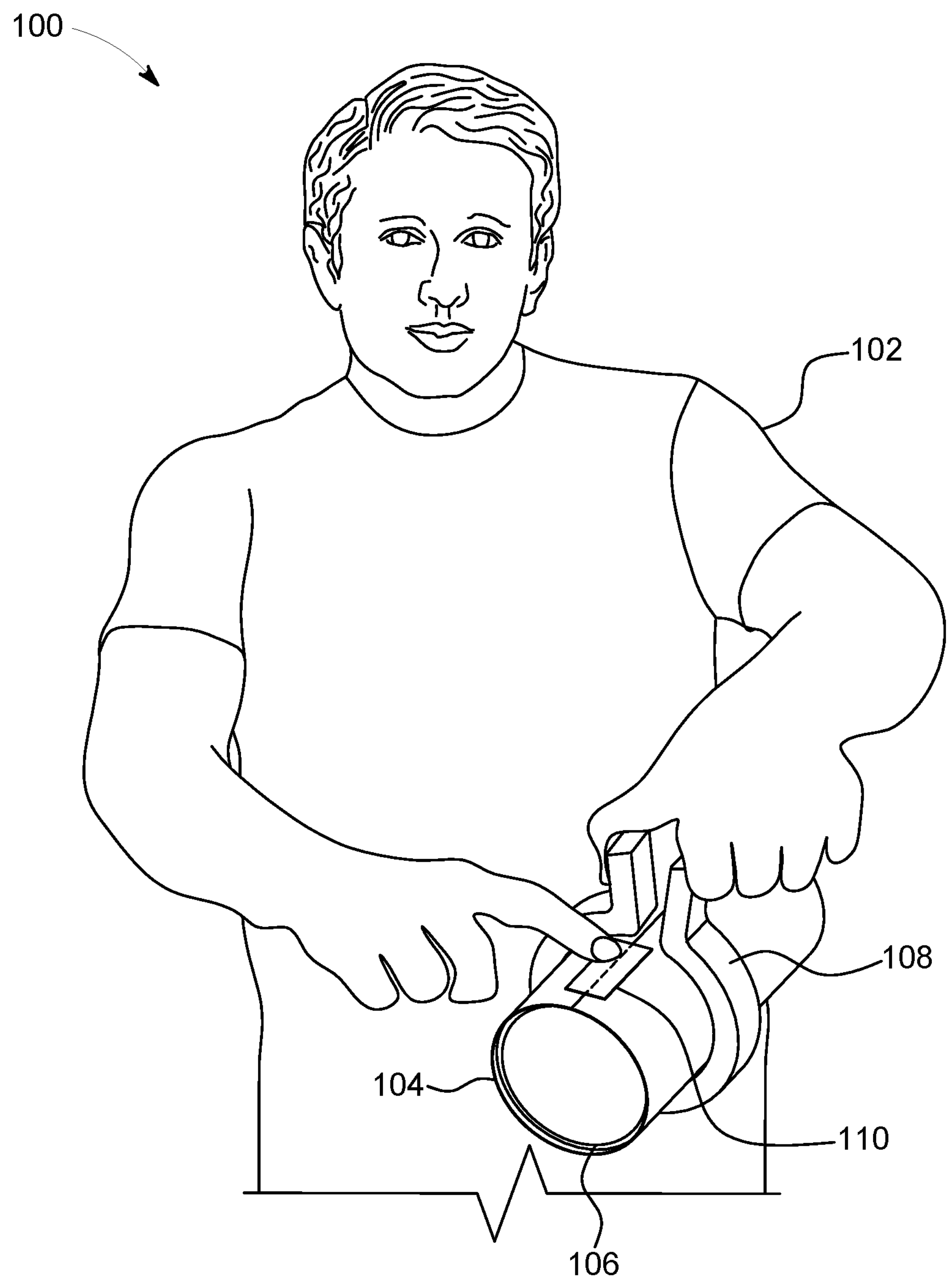
FIG. 1 depicts an example environment in which techniques and structures for providing the systems and methods disclosed herein may be implemented.

The present disclosure is directed to a substrate deposition holding apparatus that may facilitate a user in conveniently wrapping and taping a substrate around a cylindrical object. Specifically, the apparatus facilitates the user in securely taping a sublimation paper around an exterior surface of a tumbler, so that no crease or fold may be present on the sublimation paper when the paper may be wrapped and taped on the tumbler. In some aspects, the user may wrap the sublimation paper around the tumbler to imprint a predefined design on the tumbler exterior surface. Specifically, when the user securely tapes the sublimation paper around the tumbler, the user may use a heat press machine to transfer the predefined design that may printed on the sublimation paper to the tumbler exterior surface.

In a first embodiment, the apparatus may be shaped as a clamp and may include two semi-circular members that may be pivotally connected with each other. Specifically, the apparatus may include a first semi-circular member and a second semi-circular member, and distal ends of respective semi-circular members may be pivotally connected with each other to enable the apparatus move between an open position and a closed position. Proximal ends of respective semi-circular members may include holding arms that may be inclined at a predefined angle (e.g., non-zero angle) relative to each other. Specifically, a longitudinal axis of a first holding arm disposed on a first semi-circular member proximal end may be disposed at the predefined angle relative to a longitudinal axis of a second holding arm disposed on a second semi-circular member proximal end when the apparatus may be in the closed position. In some aspects, the predefined angle may be in a range of 1 to 45 degrees.

In an exemplary aspect, the apparatus may be in the open position when the first and second semi-circular member proximal ends may be disposed away from each other, and the apparatus may be in the closed position when the first and second semi-circular member proximal ends may be disposed in proximity to each other or may touch each other.

The user may move the apparatus to the open position and then insert the tumbler (with the sublimation paper wrapped around the tumbler exterior surface) between the first and second semi-circular members. The user may additionally grab or hold the two holding arms to secure the tumbler between the first and second semi-circular members.

The apparatus may further include gripping pads that may be disposed on first and second semi-circular member interior surfaces. When the user secures the tumbler between the first and second semi-circular members, the gripping pads may tightly hold the sublimation paper on the tumbler exterior surface, thus preventing the sublimation paper from developing a crease or a fold. The user may conveniently apply tape on the sublimation paper when the gripping pads hold the sublimation paper tightly on the tumbler exterior surface.

In some aspects, the apparatus may further include a clamping mechanism that may clamp the holding arms together when the apparatus may be in the closed position.

In a second embodiment, the apparatus may include slidable carriages that may be used to securely hold the tumbler with the sublimation paper. The apparatus may include a rectangular frame having four edges (first, second, third and fourth edge). The apparatus may further include a pair of rails disposed along a frame longitudinal axis between the first edge and the second edge. The apparatus may additionally include a first support bracket and a second support bracket mounted on the pair of rails. At least one of the first support bracket and the second support bracket may be slidable on the pair of rails along the frame longitudinal axis.

The apparatus may further include a first carriage pivotally connected to the first support bracket and a second carriage pivotally connected to the second support bracket. The first and second carriages may be configured to "flex out" from their respective top portions by using the pivot connections to the first and second support brackets. Further, since the first and/or second support brackets are slidable on the pair of rails, the first and/or the second carriages may also be slidable on the pair of rails along the frame longitudinal axis.

In some aspects, the first and/or the second carriage may be U-shaped, having a horizontal arm and a pair of vertical arms. In other aspects, the first and/or the second carriage may be T-shaped having the horizontal arm and a single vertical arm. The horizontal arms may include the gripping pads that may enable the apparatus to securely hold the sublimation paper when the tumbler may be placed between the first carriage and the second carriage.

The user may laterally place the tumbler on top of the horizontal arms of respective first and second carriages, and may push the tumbler down towards the frame. Downward push may "flex out" the first and second carriages away from each other, thus enabling the tumbler to be inserted between the first and second carriages. When the tumbler may be inserted between the first and second carriages, the gripping pads may securely hold the sublimation paper and the user may then conveniently apply tape on the sublimation paper.

In some aspects, the apparatus may further include a base plate and a plurality of inter-stacking blocks that may provide a stable base to the tumbler when the tumbler may be held between the first and second carriages.

When the user may have applied the tape on the sublimation paper, the user may slide the first and the second carriages away from each other on the pair of rails, and may conveniently remove the tumbler from between the first and the second carriages.

The present disclosure discloses a substrate deposition holding apparatus that facilitates a user to conveniently wrap and tape sublimation paper around a cylindrical object, e.g., a tumbler. Since the gripping pads securely and tightly hold the sublimation paper on the tumbler exterior surface, crease or fold may not develop on the sublimation paper, thus ensuring high quality imprint on the tumbler. Further, the apparatus is portable and lightweight, and the user may easily use and carry the apparatus.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. The environment 100 may include a user 102 wrapping a sublimation paper 104 around a cylindrical object 106. Specifically, the user 102 may be imprinting a predefined design onto cylindrical object exterior surface by using the sublimation paper 104.

A person ordinarily skilled in the art may appreciate that to imprint the design onto the cylindrical object exterior surface, the user 102 may wrap and tape the sublimation paper 104 with the printed design on the cylindrical object exterior surface and then use a heat press machine (not shown) to transfer the design from the sublimation paper 104 to the cylindrical object exterior surface.

The sublimation paper 104 may be made of a combination of paper, silica, binder, etc. Before wrapping the sublimation paper 104 around the cylindrical object 106, the user 102 may print the sublimation paper 104 with the predefined design by using a sublimation ink. The user 102 may print the sublimation paper 104 by using known sublimation printers (not shown).

The cylindrical object 106 may be a tumbler, a mug or any other cylindrical object. Hereinafter, the cylindrical object 106 is referred to as tumbler 106. The tumbler 106 may be a sublimation tumbler made of metal such as stainless steel. Further, the tumbler 106 may be of any dimension that may be based on user's requirements, heat press machine dimensions, and/or the like.

In some aspects, sublimation paper dimensions may be based on tumbler dimensions. Specifically, the sublimation paper 104 may be shaped as a rectangular sheet and may have a length equivalent to a tumbler length. Further, a sublimation paper width may be equivalent to or slightly greater than a tumbler circumference, so that the sublimation paper 104 may fully wrap around the tumbler exterior surface.

A person ordinarily skilled in the art may appreciate that to effectively imprint the tumbler exterior surface, the sublimation paper 104 should be tightly wrapped and taped around the tumbler exterior surface before the tumbler 106 is heated in the heat press machine to transfer the print from the sublimation paper 104 to the tumbler exterior surface. Specifically, the sublimation paper 104 should be tightly wrapped and taped around the tumbler exterior surface so that no crease or fold develops in the sublimation paper 104 when the sublimation paper 104 is wrapped around the tumbler exterior surface.

In accordance with the present disclosure, the user 102 may use a substrate deposition holding apparatus 108 (or apparatus 108) to conveniently hold the sublimation paper 104 around the tumbler exterior surface and apply tape 110 on the sublimation paper 104 to securely affix the sublimation paper 104 on the tumbler exterior surface. The apparatus 108 may include gripping pads (shown as gripping pads 220, 222 in FIG. 2) that may "grip" or securely hold the sublimation paper 104 on the tumbler exterior surface when the user 102 applies the tape 110 on the sublimation paper 104. The gripping pads ensure that the sublimation paper 104 does not slip on the tumbler exterior surface or develop crease or folds when the user 102 applies the tape 110 on the sublimation paper 104, thereby enhancing user convenience and quality of imprinted design on the tumbler 106.

Apparatus 108 structural details are described below in detail in conjunction with FIGS. 2-5.

Figure 2:
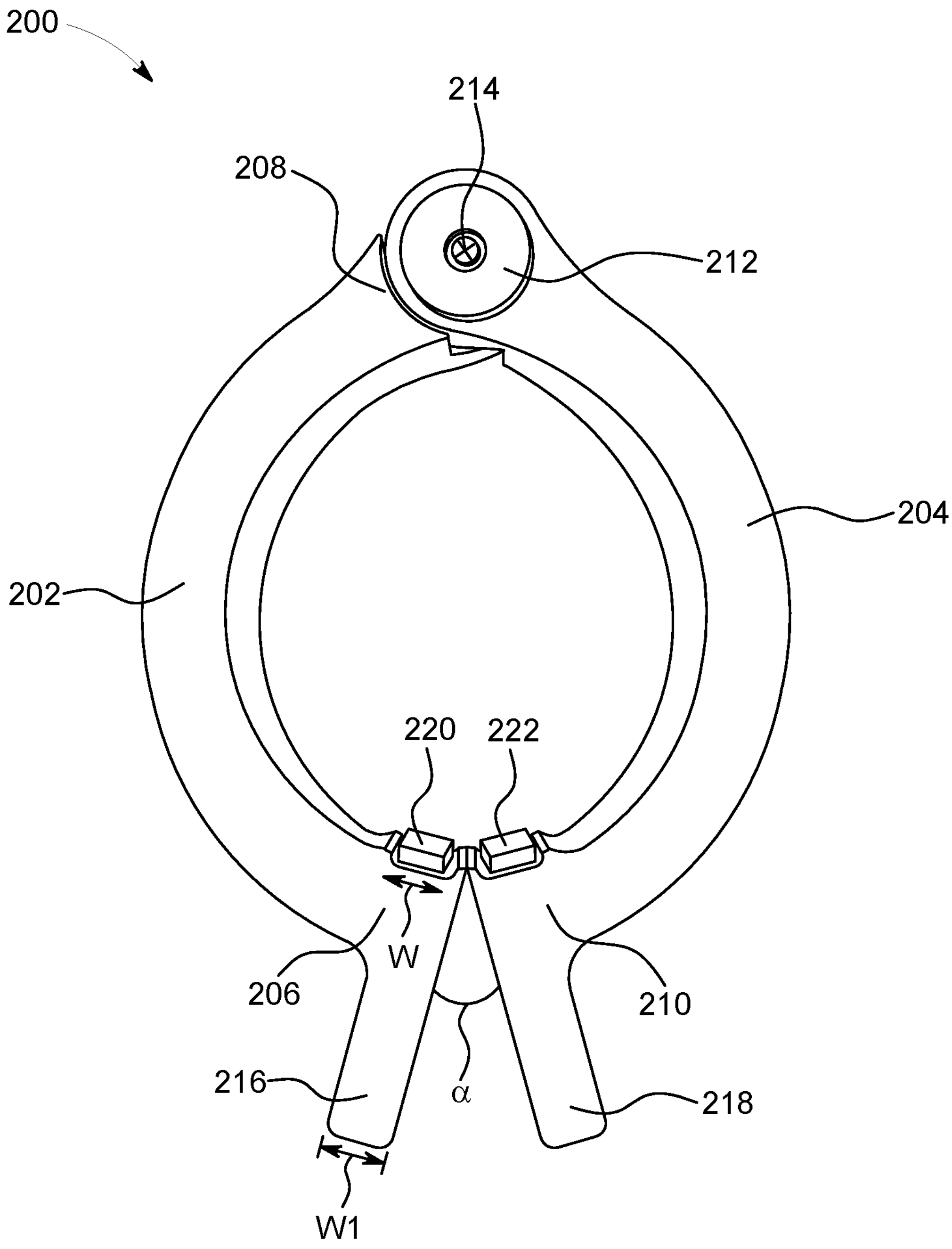
FIG. 2 depicts an example first substrate deposition holding apparatus in a closed position in accordance with the present disclosure.

FIG. 2 depicts an example first substrate deposition holding apparatus 200 in a closed position in accordance with the present disclosure. While describing FIG. 2, references may be made to FIG. 3, which depicts the first substrate deposition holding apparatus 200 (or apparatus 200) in an open position.

Figure 3:
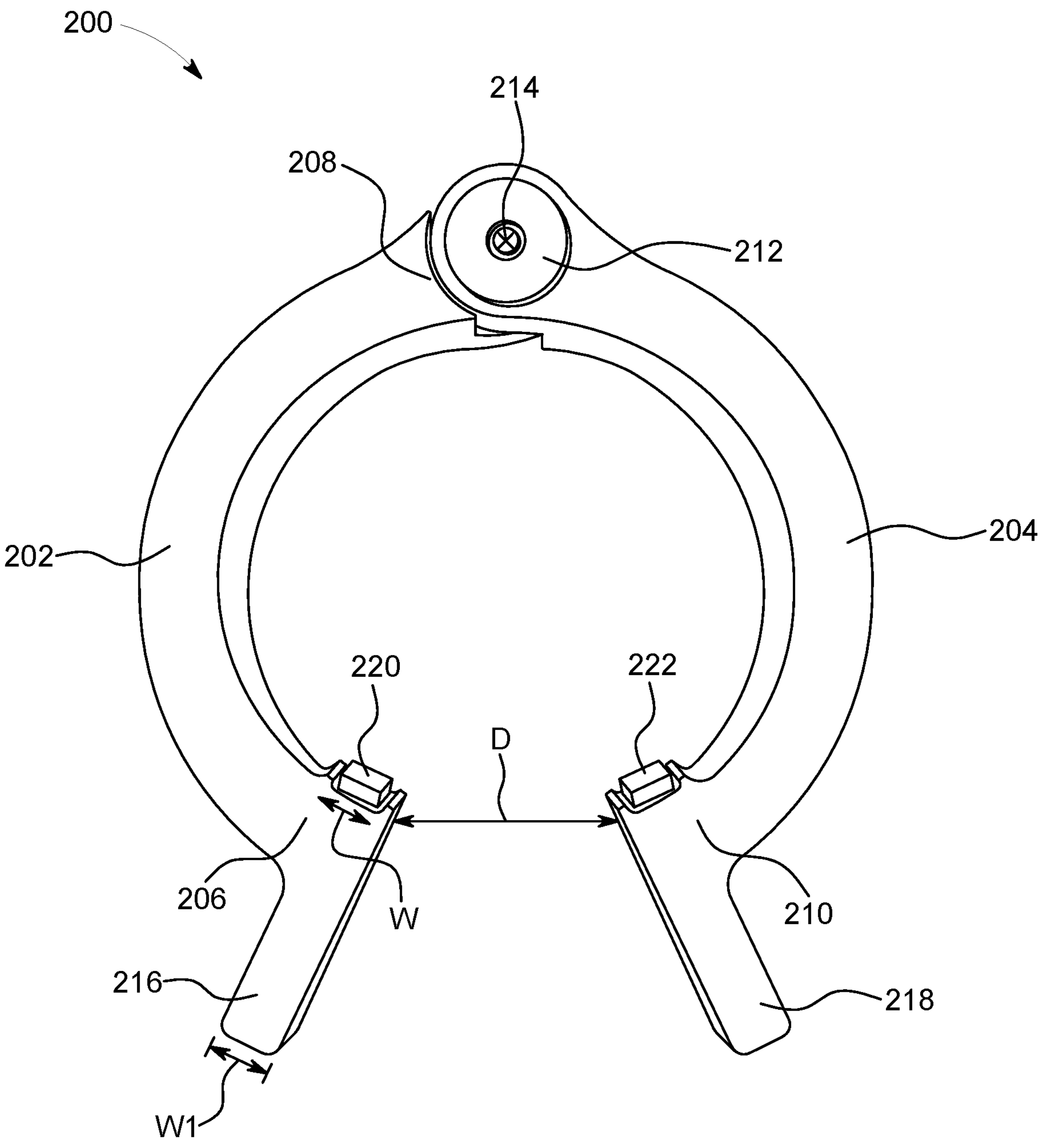
FIG. 3 depicts the first substrate deposition holding apparatus of FIG. 2 in an open position in accordance with the present disclosure.

The apparatus 200 may be same as the apparatus 108 and may be shaped as a clamp. The apparatus 200 may include a first member 202 and a second member 204. The first member 202 and the second member 204 may be made of plastic, rubber, metal, a combination thereof, and/or the like. In an exemplary aspect, the first member 202 and the second member 204 may have semi-circular shapes, as shown in FIGS. 2 and 3. Stated another way, the first member 202 is a first semi-circular member and the second member 204 is a second semi-circular member. In other aspects (not shown), the first member 202 and the second member 204 may have other shapes (e.g., semi-hexagon, semi-octagon, etc.). The present disclosure is not limited to semi-circular shape. The first member 202 and the second member 204 may have dimensions (e.g., radius, thickness, etc.) that may be based on tumbler dimensions on which the apparatus 200 may be used. For example, if the tumbler 106 has large diameter, the radii of the first and second members 202, 204 too may be large (and vice-versa).

The first member 202 may include a first proximal end 206 and a first distal end 208. Similarly, the second member 204 may include a second proximal end 210 and a second distal end 212. As shown in FIGS. 2 and 3, the second distal end 212 may be pivotally connected with the first distal end 208 via a pivot connection member 214. The pivot connection member 214 may be a pinned or hinged connection, or any other connection means that may enable the first distal end 208 and the second distal end 212 to pivotally connect with each other.

Pivotal connection between the first distal end 208 and the second distal end 212 enables the first member 202 and the second member 204 to move between the closed position (as shown in FIG. 2) and the open position (as shown in FIG. 3). In some aspects, the first proximal end 206 and the second proximal end 210 may touch each other or may be disposed in proximity to each other when the first member 202 and the second member 204 may be in the closed position. The first proximal end 206 and the second proximal end 210 may be disposed a predefined distance (e.g., a distance "D", as shown in FIG. 3) away from each other when the first member 202 and the second member 204 may be in the open position. Stated another way, the first member 202 and the second member 204 may be in the closed position when the distance "D" may tend to zero, and may be in the open position when the distance "D" may be non-zero.

The apparatus 200 may further include a first holding arm 216 and a second holding arm 218. The first holding arm 216 may be disposed on or attached to the first proximal end 206 such that the first holding arm 216 and the first member 202 form a unitary structure (e.g., a first unitary structure). Similarly, the second holding arm 216 may be disposed on or attached to the second proximal end 210 such that the second holding arm 216 and the second member 204 form a unitary structure (e.g., a second unitary structure). The first and second holding arms 216, 218 may be made of same material as the first and second members 202, 204, and may have dimensions that may depend on first and second member dimensions. Further, the first holding arm 216 may have same dimensions as the second holding arm 218.

As shown in FIG. 2, a first holding arm longitudinal axis may be disposed at a predefined angle "a" relative to a second holding arm longitudinal axis when the first member 202 and the second member 204 may be in the closed position. Stated another way, the first holding arm 216 and the second holding arm 218 may be "slanted away" from each other. In an exemplary aspect, the angle "α" may be in a range of 1 to 45 degrees. Slanted holding arms may enable the user 102 to conveniently hold the apparatus 200 around the tumbler 106.

In operation, the user 102 may move the first member 202 and the second member 204 away from each other (i.e., in the open position) by using the first and second holding arms 216, 218, and then enclose the tumbler 106 with a substrate (e.g., the sublimation paper 104) disposed on the tumbler exterior surface between the first and second members 202, 204. The user 102 may then close the first and second members 202, 204 by using the first and second holding arms 216, 218, and grab/hold the first and second holding arms 216, 218 tightly and towards each other to securely hold the tumbler 106 with the sublimation paper 104 in between the first and second members 202, 204, as shown in FIG. 1. Since the first and second holding arms 216, 218 are slanted away from each other, even a slight inward push by user fingers on the first and second holding arms 216, 218 towards each other results in tightening of the first and second members 202, 204 around the tumbler 106 and the sublimation paper 104. In this manner, the apparatus 200 facilitates the user 102 in tightly securing the sublimation paper 104 on the tumbler exterior surface.

To further aid the user 102 in tightly securing the sublimation paper 104 on the tumbler exterior surface, the apparatus 200 may include a first gripping pad 220 disposed on or attached to a first member interior surface, and a second gripping pad 222 disposed on or attached to a second member interior surface. The first and second gripping pads 220, 222 may be removably attached to the first and second members 202, 204 respectively via an adhesive, a connector, a dovetail attachment mechanism, or any other attachment means. The first gripping pad 220 may have same dimensions as the second gripping pad 222.

When the user 102 holds the sublimation paper 104 wrapped around the tumbler 106 by using the apparatus 200 (e.g., when the first and second members 202, 204 are in the closed position), the first and second gripping pads 220, 222 may firmly hold or grip the sublimation paper 104 around the tumbler exterior surface and may not allow/enable the sublimation paper 104 to slip or fold. The first and second gripping pads 220, 222 may be made of non-slip material having a high coefficient of friction. For example, the first and second gripping pads 220, 222 may be made of rubber, silicone, polyvinyl chloride foam, neoprene, thermoplastic elastomer, a combination thereof, and/or the like.

In the exemplary aspect depicted in FIGS. 2 and 3, the first and second gripping pads 220, 222 may be disposed in proximity to the first and second proximal ends 206, 210 respectively. In other aspects (not shown), the first and second gripping pads 220, 222 may be disposed anywhere on the first and second member interior surfaces. Further, in the exemplary aspect depicted in FIGS. 2 and 3, a width "W" of the first and second gripping pads 220, 222 may be equivalent to width "W1" of the first and second holding arms 216, 218. In other aspects (not shown), the width "W" may be greater (or lesser) than the width "W1". In additional aspects (not shown), the first and second gripping pads 220, 222 may have widths such that the first and second gripping pads 220, 222 cover a substantial portion (e.g., more than 25%) of the first and second member interior surface.

Furthermore, in the exemplary aspect depicted in FIGS. 2 and 3, lengths of the first and second gripping pads 220, 222 may be equivalent to wall thickness of the first and second members 202, 204. In another aspect depicted in FIG. 4, the lengths of the first and second gripping pads 220, 222 may be substantially greater than the thickness of the first and second member walls.

Figure 4:
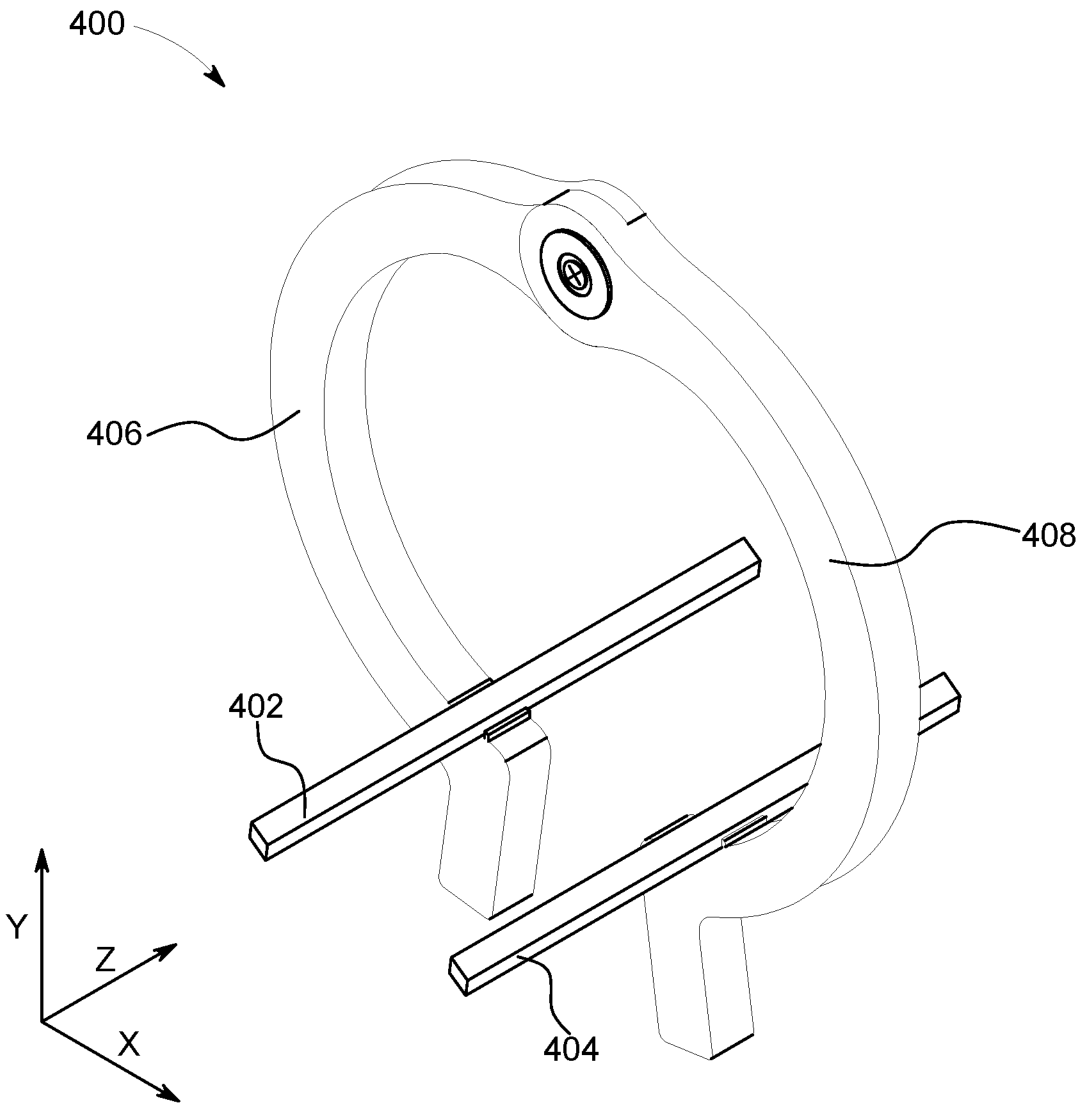
FIG. 4 depicts an example second substrate deposition holding apparatus in accordance with the present disclosure.

FIG. 4 depicts an example second substrate deposition holding apparatus 400 (or apparatus 400) in accordance with the present disclosure. The apparatus 400 may be similar to the apparatus 200; however, in the apparatus 400, a first gripping pad 402 and a second gripping pad 404 may be shaped as elongated rods (e.g., cylindrical, or cuboidal rods). The first and second gripping pads 402, 404 may be made of same material as the first and second gripping pads 220, 222, and may serve the same purpose as the first and second gripping pads 220, 222 in the apparatus 200. Specifically, when the user 102 holds the sublimation paper 104 wrapped around the tumbler 106 by using the apparatus 400, the first and second gripping pads 402, 404 may tightly secure the sublimation paper 104 on the tumbler exterior surface and may not allow the sublimation paper 104 to slip or fold. Since the first and second gripping pads 402, 404 are shaped as elongated rods, the first and second gripping pads 402, 404 hold greater sublimation paper length as compared to the first and second gripping pads 220, 222, thus enabling the user 102 to securely hold the sublimation paper 104 on the tumbler exterior surface.

In the exemplary aspect depicted in FIG. 4, a first gripping pad longitudinal axis and a second gripping pad longitudinal axis may be disposed perpendicular to a plane of a first member 406 and a second member 408. Specifically, if X-Y is the plane of the first member 406 and the second member 408, the first and second gripping pads 402, 404 may be disposed along the Z-axis.

Remaining elements of the apparatus 400 are same as the elements of the apparatus 200, and hence are not described here again for the same of simplicity and conciseness.

Figure 5:
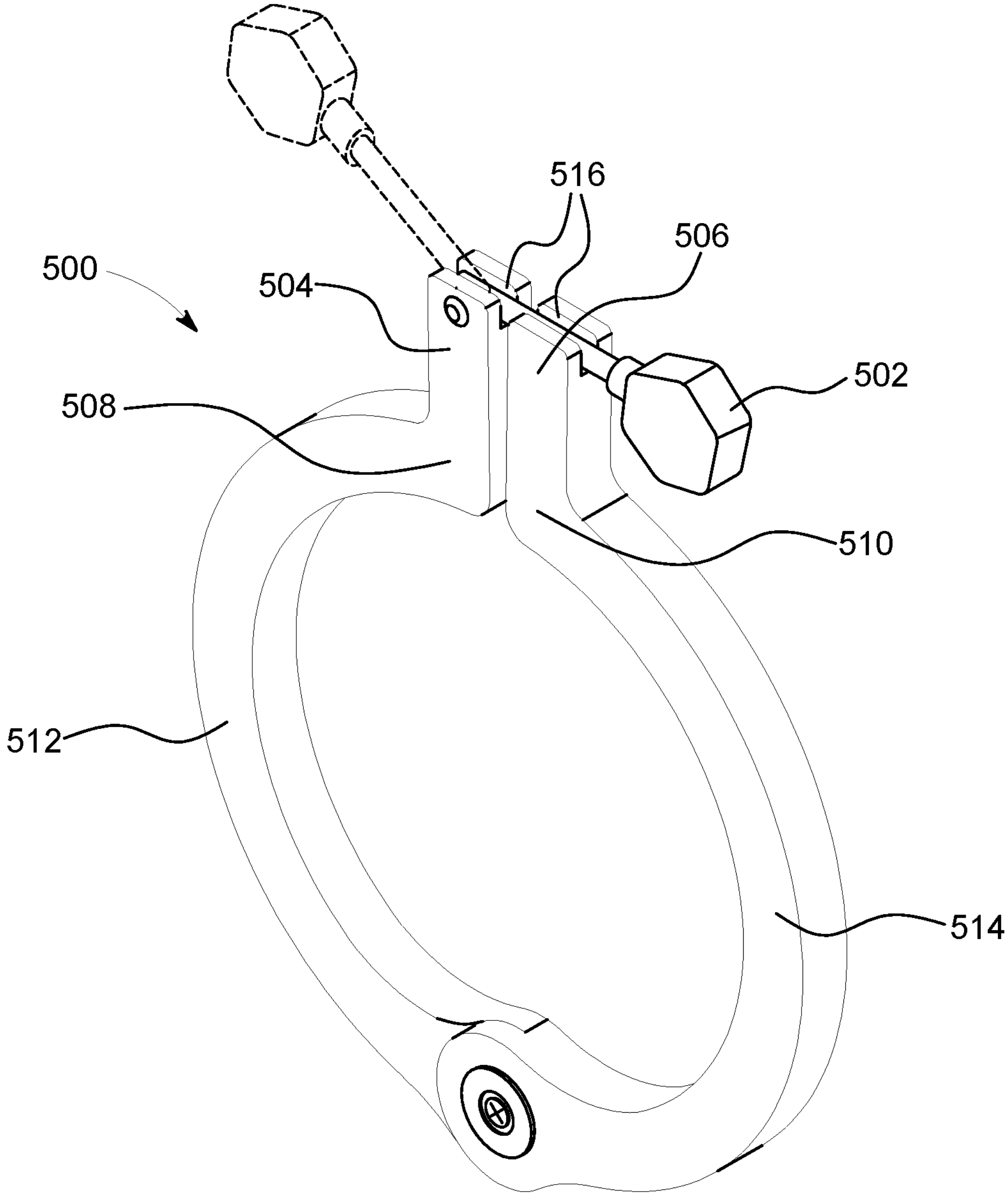
FIG. 5 depicts an example third substrate deposition holding apparatus in accordance with the present disclosure.

FIG. 5 depicts an example third substrate deposition holding apparatus 500 (or apparatus 500) in accordance with the present disclosure. The apparatus 500 may be similar to the apparatus 200; however, the apparatus 500 may additionally include a clamping mechanism 502 pivotally attached to either one of a first holding arm 504 or a second holding arm 506. For example, the clamping mechanism 502 may be pivotally attached to the first holding arm 504 and configured to axially rotate relative to the first holding arm 504.

The clamping mechanism 502 may be configured to clamp a first proximal end 508 and a second proximal end 510 together when a first member 512 and a second member 514 may be in the closed position, as shown in FIG. 5. Specifically, when the user 102 moves the first and second members 512, 514 in the closed position, the user 102 may rotate the clamping mechanism 502 from an unlocked position (shown as dotted position in FIG. 5) to a locked position, to clamp the first and second proximal ends 508, 510 (and the first and second holding arms 504, 506) together. In this case, top ends of the first and second holding arms 504, 506 may include cavities 516 that may "receive" the clamping mechanism 502 when the user 102 moves the clamping mechanism 502 in the locked position, thus enabling locking or clamping of the first and second holding arms 504, 506 together.

Clamping the first and second proximal ends 508, 510 together ensures that the apparatus 500 tightly secures the sublimation paper 104 around the tumbler exterior surface, thus facilitating in reducing probability of developing crease or folds.

Although FIG. 5 depicts a mechanical clamping mechanism, in some aspects, the clamping mechanism may be an elastic rubber that may clamp the first and second holding arms 504, 506 together when the first and second members 512, 514 are moved in the closed position.

Remaining elements of the apparatus 500 are same as the elements of the apparatus 200, and hence are not described here again for the same of simplicity and conciseness.

Figure 6:
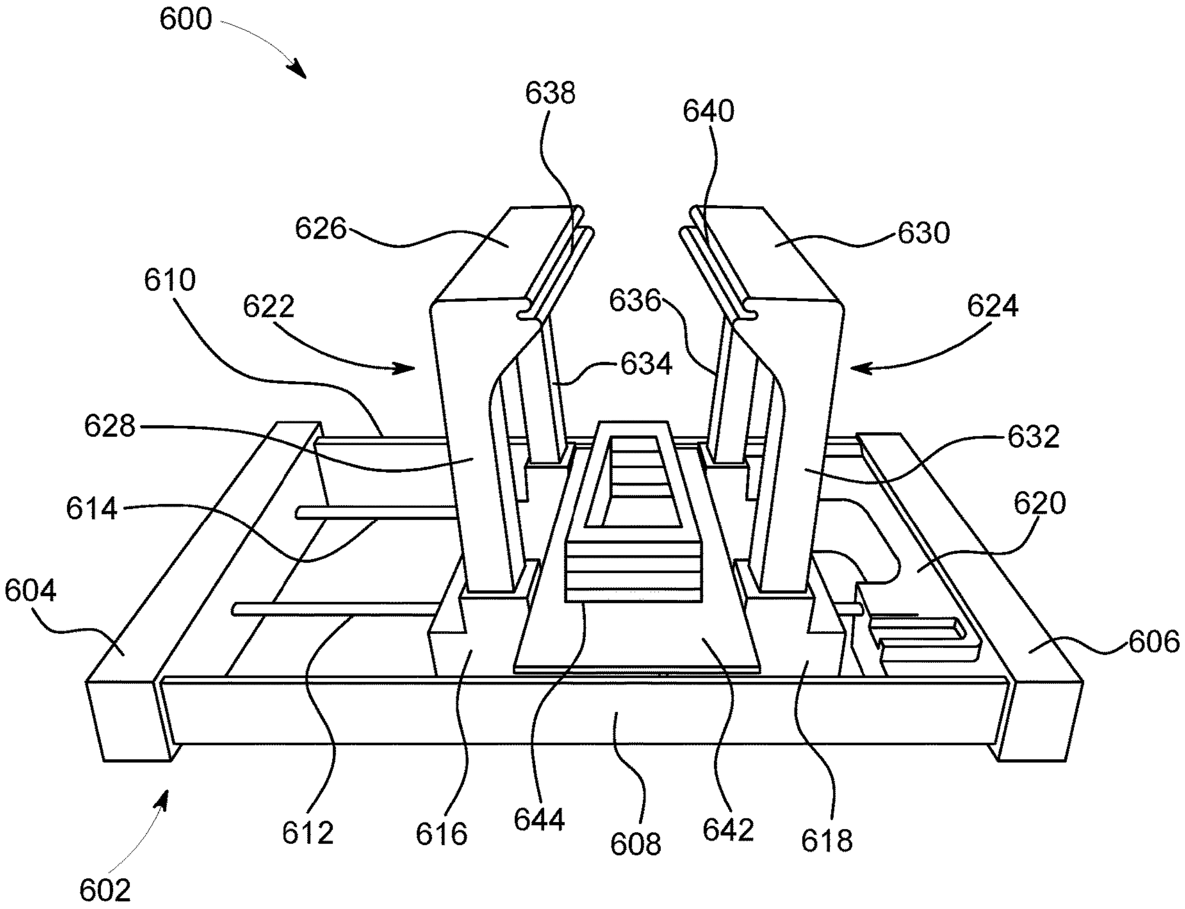
FIG. 6 depicts an example fourth substrate deposition holding apparatus in accordance with the present disclosure.

FIG. 6 depicts an example fourth substrate deposition holding apparatus 600 (or apparatus 600) in accordance with the present disclosure. While describing FIG. 6, references may be made to FIGS. 7, 8 and 9 that depict use of the apparatus 600. Similar to the apparatus 200, the apparatus 600 may enable the user 102 to conveniently hold the sublimation paper 104 around the tumbler exterior surface and apply the tape 110 on the sublimation paper 104 to securely affix the sublimation paper 104 on the tumbler exterior surface.

The apparatus 600 may include a frame 602. The frame 602 may be made of plastic, metal or any other similar material. In some aspects, the frame 602 may be rectangular having a first edge 604, a second edge 606, a third edge 608 and a fourth edge 610. Dimensions of each frame edge may depend on apparatus usage requirements and/or tumbler dimensions. As depicted in FIGS. 6-9, the first and second edges 604, 606 may be parallel to each other and perpendicular to the third and fourth edges 608, 610. Further, the third and fourth edges 608, 610 may be parallel to each other.

The apparatus 600 may further include a first rail 612 and a second rail 614 attached between the first edge 604 and the second edge 606. Specifically, proximal edges of the first and second rails 612, 614 may be attached to the first edge 604, and distal ends of the first and second rails 612, 614 may be attached to the second edge 606. The first and second rails 612, 614 may be made of metal, e.g., steel, aluminum, etc., and may have lengths that may be equivalent to third and fourth edge lengths.

As depicted in FIGS. 6-9, the first rail 612 may be disposed in proximity to the third edge 608 and the second rail 614 may be disposed in proximity to the fourth edge 610. Further, the first and second rails 612, 614 may be parallel to the third and fourth edges 608, 610.

The apparatus 600 may further include a first support bracket 616 and a second support bracket 618 mounted on the first rail 612 and the second rail 614. The first and second support brackets 616, 618 may be disposed between the first and second rails 612, 614, as shown in FIGS. 6-9. Further, longitudinal axis of the first and second support brackets 616, 618 may be parallel to the first and second edges 604, 606. Stated another way, the longitudinal axis of the first and second support brackets 616, 618 may be perpendicular to longitudinal axis of the first and second rails 612, 614.

In the exemplary aspect depicted in FIGS. 6-9, the first and second support brackets 616, 618 may be shaped as elongated L-shaped brackets and may have lengths equivalent to a distance between the first rail 612 and the second rail 614. The elongated L-shaped brackets depicted in FIGS. 6-9 should not be construed as limiting the present disclosure scope, and the first and second support brackets 616, 618 may have other shapes as well.

In some aspects, both the first and second support brackets 616, 618 may be configured to slide laterally on the first and second rails 612, 614. Specifically, the user 102 may push either of the first or second support brackets 616, 618 to slide respective bracket on the first and second rails 612, 614. In some aspects, the first and second support brackets 616, 618 may be attached to the third and fourth edges 608, 610 by springs or elastic tubes/rubber (not shown) such that the first and second support brackets 616, 618 may return to their original positions when the user 102 releases the push on the first or the second support bracket 616, 618.

In other aspects, only one of the first and second support brackets 616, 618 may be configured to slide laterally on the first and second rails 612, 614. In the exemplary aspect depicted in FIGS. 6-9, the first support bracket 616 may be configured to slide laterally on the first and second rails 612, 614, and the second support bracket 618 may be stationary. In this case, a stop 620 may be disposed between the second support bracket 618 and the second edge 606 to stop or prevent the second support bracket 618 from sliding.

The apparatus 600 may further include a first carriage 622 and a second carriage 624. The first carriage 622 may include a first horizontal arm 626 and a first vertical arm 628, and the second carriage 624 may include a second horizontal arm 630 and a second vertical arm 632. In some aspects, the first carriage 622 may further include a third vertical arm 634 and the second carriage 624 may further include a fourth vertical arm 636.

In some aspects, the first horizontal arm 626, the first vertical arm 628 and the third vertical arm 634 may form a unitary U-shaped first carriage 622. In other aspects (not shown), the first carriage 622 may not include the third vertical arm 634, and the first horizontal arm 626 and the first vertical arm 628 may form a unitary T-shaped first carriage 622. In yet another aspect, the carriage 622 may include more than two vertical arms. Similarly, the second horizontal arm 630, the second vertical arm 632 and the fourth vertical arm 636 may form a U-shaped second carriage 624. In other aspects (not shown), the second carriage 624 may not include the fourth vertical arm 636, and the second horizontal arm 630 and the second vertical arm 632 may form a unitary T-shaped second carriage 624.

The first horizontal arm 626 and the second horizontal arm 630 may be parallel to the first edge 604 and the second edge 606. Further, bottom ends of the first and third vertical arms 628, 634 may be pivotally connected, via hinges or other pinned connection means, to the first support bracket 616. Top ends of the first and third vertical arms 628, 634 may be rigidly connected to the first horizontal arm 626. Since the bottom ends of the first and third vertical arms 628, 634 are pivotally connected to the first support bracket 616, the user 102 may conveniently push the first horizontal arm 626 away from the second horizontal arm 630 to "flex out" the first carriage 622 away from the second carriage 624 and increase a distance between respective horizontal arms of the first and second carriages 622, 624.

Similarly, bottom ends of the second and fourth vertical arms 632, 636 may be pivotally connected, via hinges or other pinned connection means, to the second support bracket 618. Top ends of the second and fourth vertical arms 632, 636 may be rigidly connected to the second horizontal arm 630. Similar to the first carriage 622, the user 102 may push the second horizontal arm 630 away from the first horizontal arm 626 to flex out the second carriage 624 away from the first carriage 622.

Hinged or pivotal connection, as described above, enables the vertical arms to be flexed away from each other at unequal distances. Therefore, when a tapered tumbler may be inserted between the two horizontal arms, the vertical arms may be flexed away from each other at unequal distances to enable the tumbler to be inserted conveniently between the horizontal arms.

The apparatus 600 may further include a first gripping pad 638 and a second gripping pad 640. The first and second gripping pads 638, 640 may be same as or similar to the first and second gripping pads 220, 222 described above.

The first gripping pad 638 may be removably attached, via an adhesive, a dovetail attachment mechanism or any other attachment means, to a first horizontal arm first edge facing the second horizontal arm 630. Similarly, the second gripping pad 640 may be removably attached, via an adhesive, a dovetail attachment mechanism or any other attachment means, to a second horizontal arm second edge facing the first horizontal arm 626. Lengths of first and second gripping pads 638 may be equivalent to lengths of the first and second horizontal arms 626, 630. In other aspects, the lengths of first and second gripping pads 638, 640 may be less than the lengths of the first and second horizontal arms 626, 630. In yet another aspect, the first and/or the second gripping pads 638, 640 may made of a plurality of mini-gripping pads and may not be a single elongated pad.

Similar to the first and second gripping pads 220, 222, the first and second gripping pads 638, 640 may be configured to hold a substrate (e.g., the sublimation paper 104) disposed on the tumbler exterior surface when the tumbler 106 may be placed between the first and second carriages 622, 624. In some aspects, the first gripping pad 638 may be disposed at an underside of the first horizontal arm first edge and the second gripping pad 640 may be disposed at an underside of the second horizontal arm second edge, to enable secure sublimation paper grip on the tumbler exterior surface when the tumbler 106 may be placed between the first and second carriages 622, 624.

The apparatus 600 may further include a base plate 642 disposed between the first support bracket 616 and the second support bracket 618. In some aspects, the base plate 642 may be rectangular and a base plate longitudinal axis may be parallel to the first and second edges 604, 606. The base plate 642 may be attached to the first and second rails 612, 614 or the third and fourth edges 608, 610. Further, in an exemplary aspect, the base plate 642 may be configured to move vertically up or down such that a distance between the base plate 642 and the first horizontal arm 626 and the second horizontal arm 630 may be adjustable. In this case, the user 102 may pull or push the base plate 642 to move the base plate 642 up or down relative to the first and second horizontal arms 626, 630 (or the frame 602). In other aspects, the base plate 642 may be stationary (or not configured to vertically move) and the first and second carriages 622, 624 may be configured to move vertically up or down relative to the base plate 642.

Figure 7:
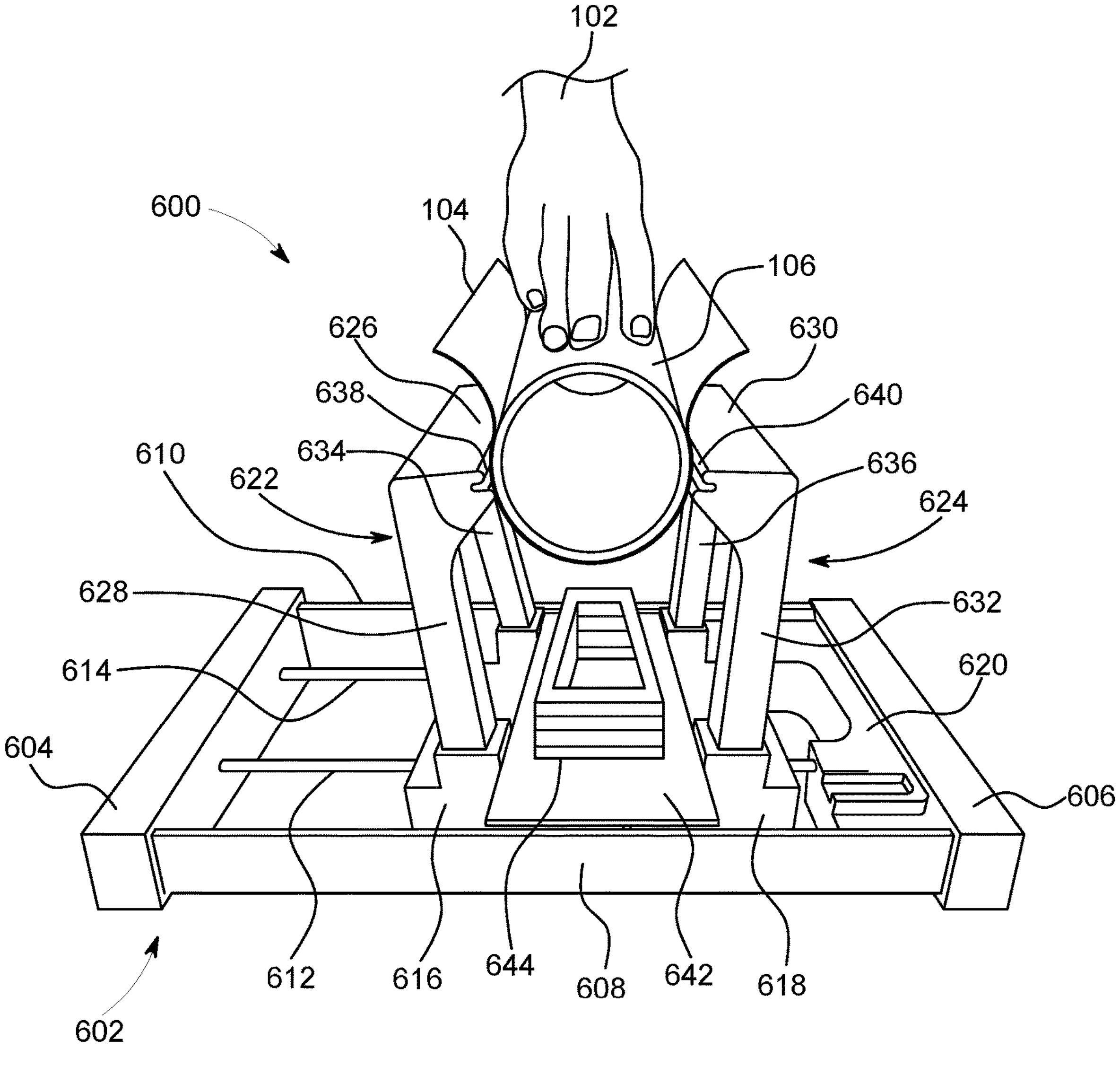
FIG. 7 depicts a view of a user placing a tumbler in the fourth substrate deposition holding apparatus of FIG. 6 in accordance with the present disclosure.
Figure 8:
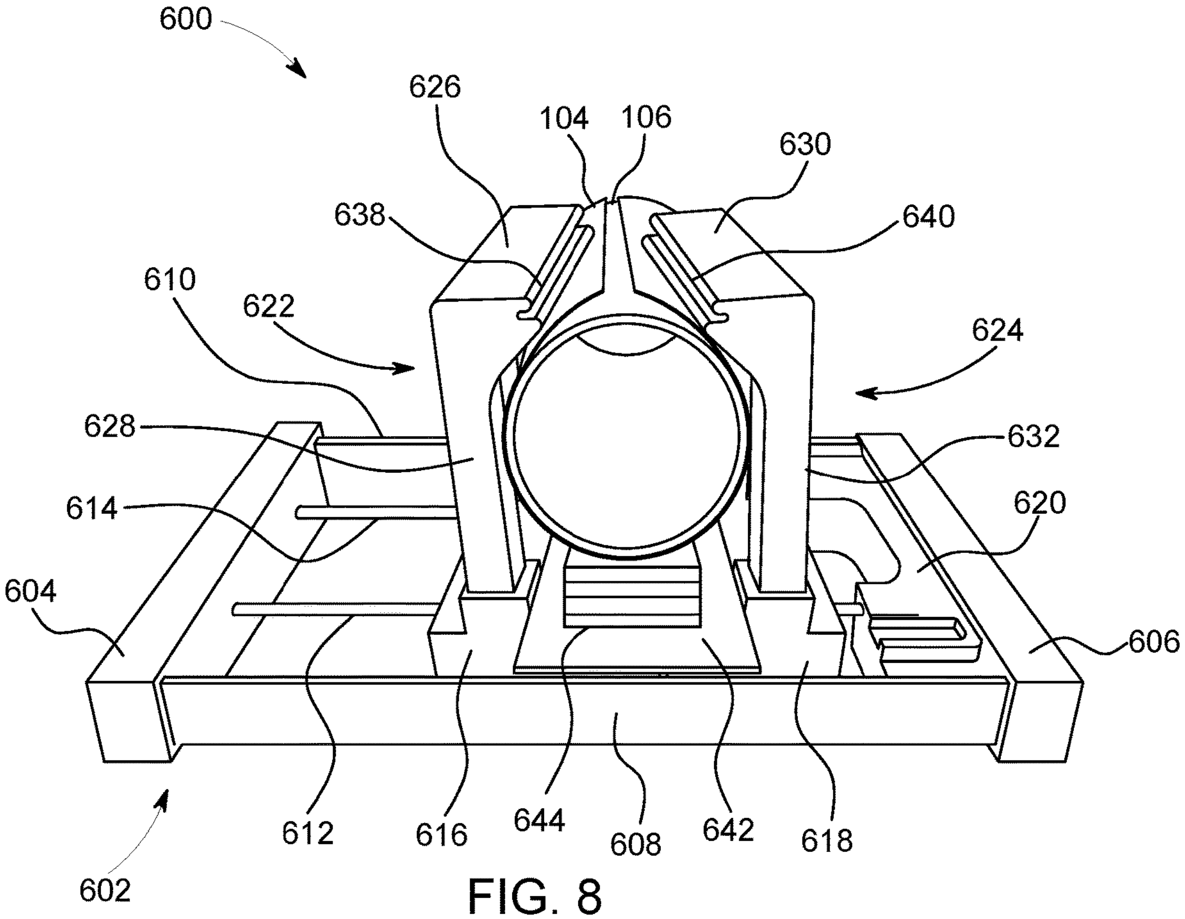
FIG. 8 depicts a view of a tumbler disposed in the fourth substrate deposition holding apparatus of FIG. 6 in accordance with the present disclosure.

In operation, the user 102 may place the tumbler 106 (with the sublimation paper 104 wrapped around the tumbler exterior surface) on the first and second horizontal arms 626, 630 and may push the tumbler 106 "down" towards the base plate 642, as shown in FIG. 7. The downward push and tumbler circular circumference may cause the first and second carriages 622, 624 to flex out, thus enabling the tumbler 106 to be inserted and held between the first and second carriages 622, 624, as shown in FIG. 8. The user 102 may then move the base plate 642 up based on the tumbler diameter so that the base plate 642 may touch the tumbler exterior surface and the tumbler 106 may rest on the base plate 642, thereby stably securing the tumbler 106 between the first and second carriages 622, 624. If the base plate 642 is not configured to move up, the apparatus 600 may include a plurality of inter-stacking blocks 644 disposed on a base plate top surface, which the user 102 may use to touch the tumbler exterior surface and provide a stable "base" to the tumbler 106 to rest on.

Figure 9:
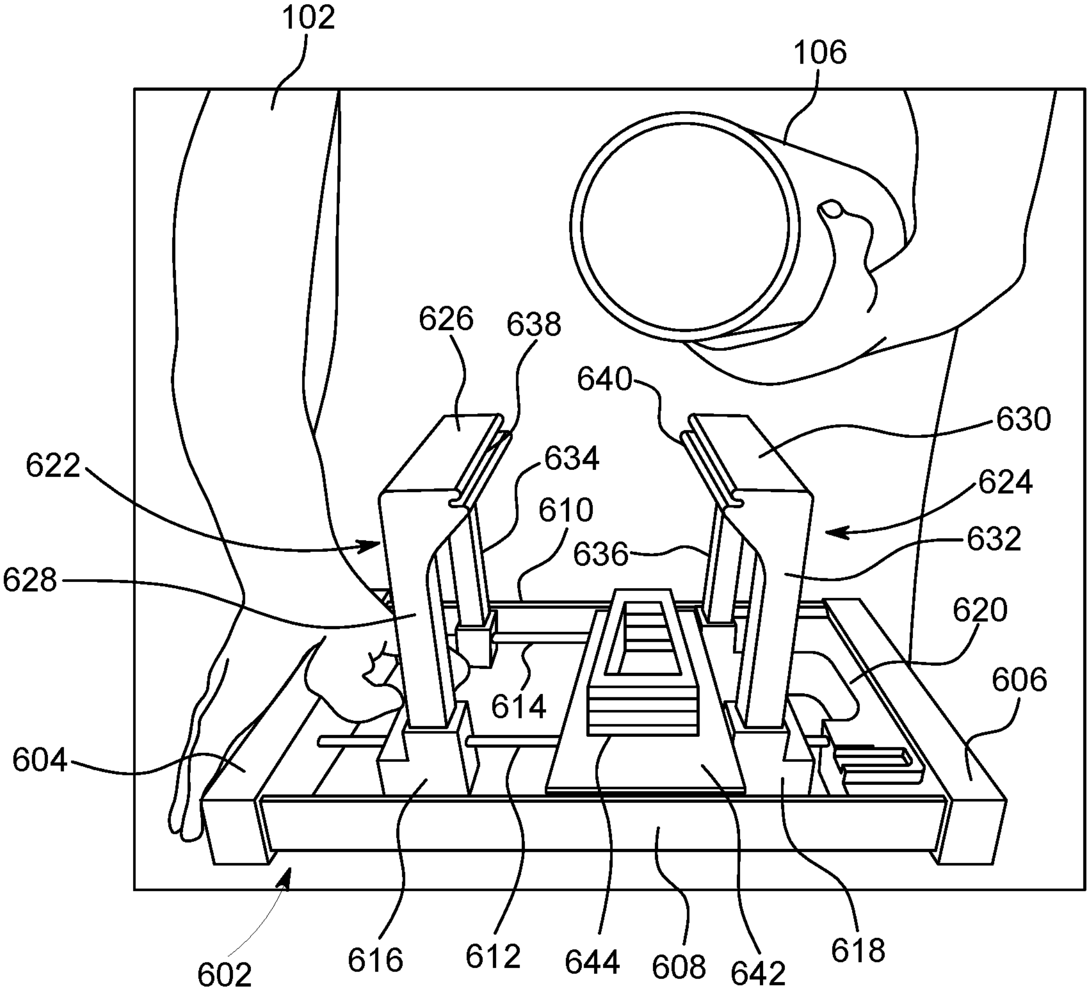
FIG. 9 depicts a view of a user removing the tumbler from the fourth substrate deposition holding apparatus of FIG. 6 in accordance with the present disclosure.

When the tumbler 106 may be stably placed between the first and second carriages 622, 624, the first and second gripping pads 638, 640 may tightly hold the sublimation paper 104 around the tumbler exterior surface, thus enabling the user 102 to conveniently apply the tape 110 on the sublimation paper 104, as described above in conjunction with FIGS. 1-3. When the user 102 may have applied the tape 110 on the sublimation paper 104, the user 102 may slide the first carriage 622 away from the second carriage 624 (e.g., by sliding the first support bracket 616 on the first and second rails 612, 614), and conveniently remove the tumbler 106 from the apparatus 600, as shown in FIG. 9.

Although the description above describes an aspect where the apparatus 600 includes two carriages, in some aspects, the apparatus 600 may include a single carriage (and not two carriages). In this case, the horizontal arm of the second carriage 624 may be affixed to a frame end piece. In addition, in this case, the stop 620 may not be required in the apparatus 600 as the second carriage may not be present (and hence not slidable on the rails 612, 614).

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc., should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. An apparatus comprising:

a first member having a first proximal end and a first distal end;

a second member having a second proximal end and a second distal end, wherein the second distal end is pivotally connected with the first distal end to enable the first member and the second member to move between a closed position and an open position;

a first holding arm disposed on the first proximal end and a second holding arm disposed on the second proximal end, wherein a first holding arm longitudinal axis and a second holding arm longitudinal axis are disposed at a predefined angle relative to each other when the first member and the second member are in the closed position; and a first gripping pad disposed on a first member interior surface and a second gripping pad disposed on a second member interior surface.

2. The apparatus of claim 1, wherein the first gripping pad is disposed in proximity to the first proximal end and the second gripping pad is disposed in proximity to the second proximal end.

3. The apparatus of claim 1, wherein the first member and the first holding arm form a first unitary structure, and the second member and the second holding arm form a second unitary structure.

4. The apparatus of claim 1, wherein the first member and the second member have semi-circular shapes.

5. The apparatus of claim 4, wherein the first gripping pad and the second gripping pad are configured to hold a substrate disposed on a cylindrical object exterior surface when the first member and the second member are in the closed position.

6. The apparatus of claim 5, wherein the substrate is a sublimation paper.

7. The apparatus of claim 1, wherein the predefined angle is in a range of 1 to 45 degrees.

8. The apparatus of claim 1, wherein the first proximal end and the second proximal end are in proximity to each other when the first member and the second member are in the closed position.

9. The apparatus of claim 8, wherein the first proximal end and the second proximal end are disposed at a predefined distance away from each other when the first member and the second member are in the open position.

10. The apparatus of claim 1, wherein the first gripping pad and the second gripping pad are made of at least one of: rubber, silicone, polyvinyl chloride foam, neoprene and thermoplastic elastomer.

11. The apparatus of claim 1, wherein the first gripping pad is removably attached to the first member interior surface via an adhesive or a dovetail attachment mechanism, and the second gripping pad is removably attached to the second member interior surface via the adhesive or the dovetail attachment mechanism.

12. The apparatus of claim 1 further comprising a clamping mechanism configured to clamp the first proximal end and the second proximal end together when the first member and the second member are in the closed position.

13. An apparatus comprising:

a first semi-circular member having a first proximal end and a first distal end;

a second semi-circular member having a second proximal end and a second distal end, wherein the second distal end is pivotally connected with the first distal end to enable the first semi-circular member and the second semi-circular member to move between a closed position and an open position;

a first holding arm disposed on the first proximal end and a second holding arm disposed on the second proximal end, wherein a first holding arm longitudinal axis and a second holding arm longitudinal axis are disposed at a predefined angle relative to each other when the first semi-circular member and the second semi-circular member are in the closed position; and a first gripping pad disposed on a first semi-circular member interior surface and a second gripping pad disposed on a second semi-circular member interior surface, wherein the first gripping pad and the second gripping pad are configured to hold a substrate disposed on a cylindrical object exterior surface when the first semi-circular member and the second semi-circular member are in the closed position.

14. The apparatus of claim 13, wherein the substrate is a sublimation paper.

15. The apparatus of claim 13, wherein the first proximal end and the second proximal end are in proximity to each other when the first semi-circular member and the second semi-circular member are in the closed position.

16. The apparatus of claim 15, wherein the first proximal end and the second proximal end are disposed at a predefined distance away from each other when the first semi-circular member and the second semi-circular member are in the open position.

17. The apparatus of claim 13 further comprising a clamping mechanism configured to clamp the first proximal end and the second proximal end together when the first semi-circular member and the second semi-circular member are in the closed position.

18. An apparatus comprising:

a first semi-circular member having a first proximal end and a first distal end;

a second semi-circular member having a second proximal end and a second distal end, wherein the second distal end is pivotally connected with the first distal end to enable the first semi-circular member and the second semi-circular member to move between a closed position and an open position;

a first holding arm disposed on the first proximal end and the second holding arm disposed on a second proximal end, wherein a first holding arm longitudinal axis and a second holding arm longitudinal axis are disposed at a predefined angle relative to each other when the first semi-circular member and the second semi-circular member are in the closed position;

a clamping mechanism configured to clamp the first proximal end and the second proximal end together when the first semi-circular member and the second semi-circular member are in the closed position; and a first gripping pad disposed on a first semi-circular interior surface and a second gripping pad disposed on a second semi-circular interior surface, wherein the first gripping pad and the second gripping pad are configured to hold a substrate disposed on a cylindrical object exterior surface when the first semi-circular member and the second semi-circular member are in the closed position.

19. The apparatus of claim 18, wherein the substrate is a sublimation paper.

20. The apparatus of claim 18, wherein the predefined angle is in a range of 1 to 45 degrees.

* * * * *